Aug. 12, 1941.    C. C. BENNETT    2,251,911
POWER TESTER
Original Filed June 9, 1936    2 Sheets-Sheet 2

Inventor
Claude C. Bennett
By Charles L. Reynolds
Attorney

Patented Aug. 12, 1941

2,251,911

UNITED STATES PATENT OFFICE 2,251,911

POWER TESTER

Claude C. Bennett, South Bend, Ind., assignor to A. E. Feragen, Inc., Seattle, Wash., a corporation of Washington Application June 9, 1936, Serial No. 84,273
Renewed December 18, 1939

7 Claims. (Cl. 265—24)

My invention relates to machines for testing automobiles, more particularly for testing the power delivered at the automobile's driving wheels under various conditions of speed and load, thus indirectly testing the power of the automobile's engine, and by means of which, concurrently with the progress of the test, the engine may be suitably adjusted.

It is an object of this invention to provide a device whereby the engine may be tested in the car and under conditions simulating road conditions, and by a machine whereby a workman may conveniently control the conditions of the test at the same time and from the same position where he stands to work upon the engine, so that he may conveniently accomplish adjustments and test the effect of such adjustments at various speeds, and under various operating conditions of speed and load, accomplishing both the adjustments of the engine and the control of the conditions of the test, and observing the indications of the tests and of the condition of the engine without leaving his position at the engine.

It is a further object to provide a machine of this character in which the owner of the car or a workman occupying the driver's seat may control the engine in the normal manner and with the usual controls, as it would be controlled while traveling on the road, and at the same time can vary the conditions of the tests to simulate varying service conditions.

It is a further object to provide in a machine of this character a power absorption device which will function properly under tests of appreciable duration, and at varying speeds, and such a power absorption device as disclosed takes the form of an hydraulic absorption dynamometer. It is a further object, when using a dynamometer of this type, to provide controls and indicators peculiarly adapted to the use of such a power absorption device, and to the requirements of such tests as those indicated above.

It is an object to provide an automatic compensator, of particular value to extended tests, whereby the resistance of the dynamometer may be kept substantially constant, without appreciable attention on the part of an operator. More particularly, it is an object to maintain the volume of water within or passing through the dynamometer automatically at a given value, which may be varied at will, decreasing the amount of water within the dynamometer as the torque tends to increase, or increasing the amount therein as the torque tends to decrease, thereby maintaining the resistance of the dynamometer constant, and imposing a constant load on the engine being tested.

It is an object to provide a machine for accomplishing such tests which may be set up within a garage or like establishment, which will take up a minimum of floor space, and which will be thoroughly rugged and reliable in operation over extended periods.

Other objects, and more particularly such as pertain to details of the operation of the machine, or the mechanical structure thereof, will be better understood as this specification progresses.

My invention comprises the novel machine as a whole, and the several novel parts thereof and their relative combination, all as shown in the accompanying drawings, and as will be hereafter described in this specification and more particularly pointed out and claimed in the claims which will be found at the end of the same.

In the accompanying drawings I have shown my invention in illustrative forms, as now preferred by me.

Figure 3 is a section in the plane of the torque arm through the pressure responsive means controlled by the latter, incorporating the automatic compensator to maintain constant resistance.

Figure 1:
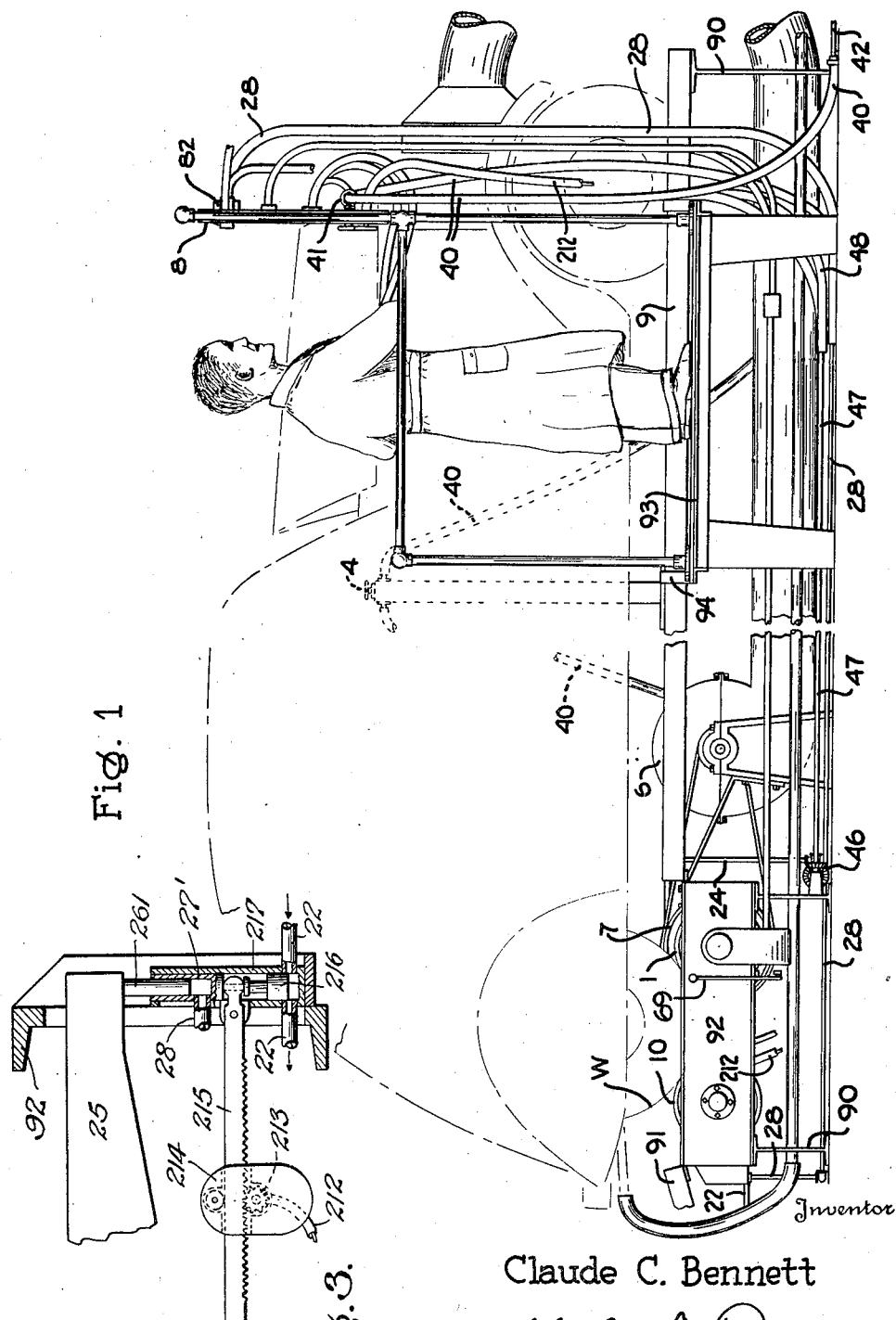
Figure 1 is a side elevation of the complete machine, showing an automobile placed thereon in operative position.

In testing an automobile it is convenient to run it upon spaced runways 9, elevated somewhat above the floor by means of supports 90. In this way the various testing devices, controls, etc. may be formed as an integral part of the machine, and kept in general below the level of the automobile chassis, and running gear, and within the general confines of the automobile, for economy of floor space, and the entire machine may be installed as a unit without special preparation, such as the digging of a pit. However, it will be understood that the machine might well be installed in a pit or otherwise upon the floor of the garage, and to this extent the employment of an elevated framework and runways is a matter of convenience, and the modifications in design for a pit installation would be obvious to a man skilled in this art. Access may be had to the runway by means of ramps, indicated at 91.

Adjacent the end of the runway which is to support the driving wheels of the car, usually the rear wheels, are supported a pair of rollers I and I', one in each runway, and spaced from these rollers to form with them a cradle for the wheel W of the car are rollers 10 and 10'. Both rollers 1 and 1' are secured upon a transverse shaft 11 so that both rollers turn at the same rate of speed. Preferably the rollers 10 and 10' are merely idlers, and serve to permit the wheel W to roll freely, and in doing so to rotate the rollers 1 and 1'. These rollers are of sufficient width to accommodate an automobile tread of any usual width. The entire arrangement may be supported in a frame 92 which is rigidly secured to and in effect forms a part of the main frame.

Mounted upon the shaft 11 is an hydraulic absorption dynamometer, generally indicated by the numeral 2. The structure of such a dynamometer (for example, of the Froude type) is well known, and the particular type employed may be any one found suitable. In effect a rotor (not shown) is secured upon the shaft 11 to be rotated thereby, and a case 20 is oscillatably mounted upon the shaft 11 surrounding the rotor by bearing members 21. Fluid, usually water, is supplied to the interior of the dynamometer by a conduit 22, and after passing through the dynamometer is discharged by means of a conduit 23. The amount of air within the dynamometer, which is one means of controlling the amount of water therein, may be controlled by means of an air vent line 24, connected to the axial part of the dynamometer. Thus the water within the dynamometer transmits the power from the shaft and rotor to the stator or case 20, and in so doing absorbs the power delivered to the shaft 11, and produces a torque which is impressed upon a torque arm 25 secured to the case 20. Arrangements are made to control the water supply to and the discharge from the dynamometer, and for controlling the venting of the air. These will be described later, but it is desired to point out here that the water discharge valve should be located close to the dynamometer itself, and to that end I provide a control valve 26 adjacent the dynamometer case. Because the dynamometer case must be free to oscillate with the minimum of external resistance, in response to the torque transmitted to it through the liquid within, flexible connections must be employed in the various lines leading to the dynamometer, as is customary in such devices.

It will be observed that the dynamometer is disposed between the rollers 1 and 1', and beneath the rear end of the automobile. The dynamometer may be made sufficiently small that it does not project materially above the level of the runways 9, so that all parts of the running gear of the car may readily clear it in running upon the runways. An hydraulic absorption dynamometer will absorb large quantities of energy over extended periods, and will still continue to function properly and accurately. Thus located it requires no space in addition to that occupied by the automobile.

Being located beneath the rear end of the car, and the workman working upon the engine being adjacent the front end of the car, it is difficult for him directly to coordinate adjustments with the indications of torque, or to read a revolution counter which must be associated with the shaft 11. Moreover, it would be extremely difficult for him to vary the water supply to or the discharge from the dynamometer, or the venting of the same, while working upon the engine. To the end that the workman may effect adjustments in the dynamometer, observe the indications resulting from its operation, and so control the conditions of the test, provision is made to group all such controls and indications at one point, conveniently to the workman who is working upon the automobile's engine. This is complicated, however, by the fact that the workman is not always in the same position. Some cars have a short wheel base; others are considerably longer. I have provided a platform 93 whereon the workman may stand, which is supported along one side of the main frame, and which is guided thereon as, for example, by the medium of hangers 94, so that it may be adjusted lengthwise of the runway 9, to place it adjacent the engine of any car in position upon the runways and upon the rollers 1 and 1'.

In Figure 3 the pressure responsive plunger 261, acted upon by the torque arm 25 is pressed down in the cylinder 27', as before described, the pressure being communicated through the pressure line 28 to the gauge 82, but in this form the cylinder 27' in itself constitutes part of a plunger valve, movable in a cylinder 217, through which passes water for delivery to the dynamometer. The water supply pipe 22 is cut and connected to opposite sides of the cylinder 217, and the valve 216 cooperates with the ports thus formed to open or close them by amounts which correspond to the pressure developed at the end of the torque arm 25. Should this pressure fall, because of insufficient water within the dynamometer, a resisting force, such as the lever 215 and adjustable weight 214, acts upon the plunger 27' and its connected valve 216 to raise them; this admits more water to the dynamometer. The pressure of the torque arm 25 increases, pressing the valve 216 downward, and restricting the flow of water into the dynamometer. Should the pressure of the torque arm increase unduly the valve 216 similarly decreases the water supply, thus lessening the pressure and restoring it to the desired value. An automatically regulated, constant torque or resistance thus ensues, and may be maintained without attention over protracted periods. Its value depends on the resistance of the lever 25, governed by the position of the weight 214, and this can be regulated from the platform 93, or elsewhere, by incorporating a pinion 213 in the weight 214, meshing with a rack on the lever. A flexible shaft 212, or like means, may be led to the control handle 211 on the panel 8, so that the resistance can be set and regulated from a distance.

The water supply conduit 22 is preferably led also through a flexible hose 40 and a valve 4, the purpose of which will be explained hereafter, to a control valve 41 on the panel 8, so that water is supplied from a pipe 42 leading to the water main or other suitable source, preferably under pressure, past the valve 41 on the panel, thence past the valve 4 and thence into the interior of the dynamometer 2, through the pipe 22. The water pressure is indicated by a gauge, not shown, connected by a suitable conduit to the water supply line. The water discharge line 23 leads to a drain or to any suitable receiver, but since the discharge control valve 26 is located closely adjacent the dynamometer I provide means to control this valve from the platform 93. Thus the stem of the valve 26 is extended, as indicated at 45, and is connected through bevel gears or like devices at 46 to a shaft 47 extending lengthwise of one of the runways 9 to a point adjacent the platform 93 where it is connected through a flexible shaft 48 or like means to a control handle 49 on the panel 8. By these or any equivalent means the discharge of water from the dynamometer may be controlled without leaving the platform. Similarly the air vent pipe 24 leads lengthwise of the runway 9, and communicates through a flexible hose 43 to a control valve 44 upon the panel 8.

It is sometimes desirable as a quick check on the power of an automobile to determine what force is developed, as in pulling. Such a test will indicate to a prospective customer whether or not his engine is developing the power it should. An automobile, being driven by an internal combustion engine, cannot be coupled while stationary to a drawbar and then achieve any pull, but the automobile can be run on this machine at any desired speed, without appreciable resistance, and then resistance can be thrown in, by admitting water to the dynamometer, tending to stop the rollers 1 and 1', so that in effect the automobile tends to roll forward, and the amount of pull developed in so doing may be measured.

Figure 2:
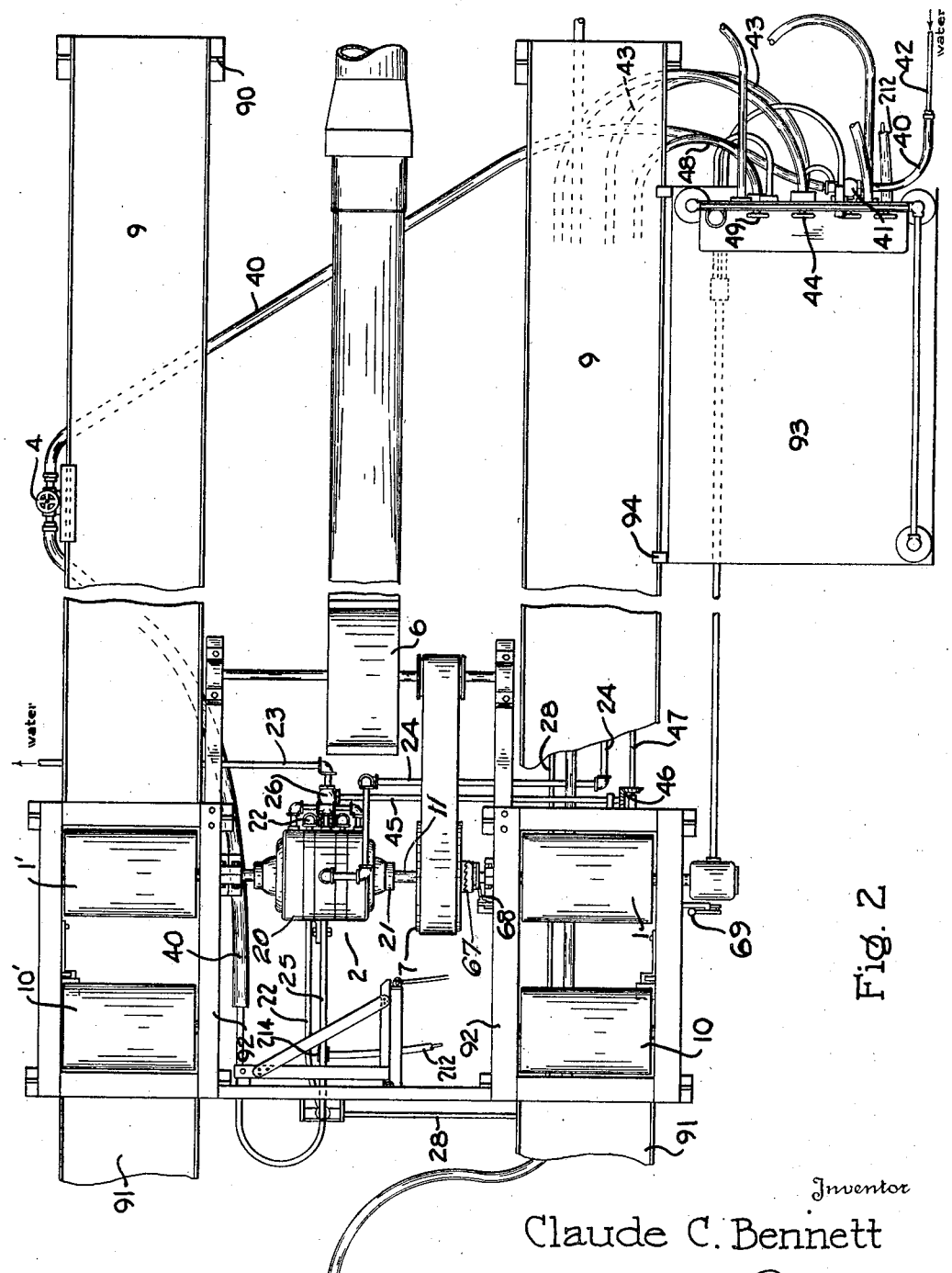
Figure 2 is a plan view of the machine, with certain parts broken away.

As will now be evident, an automobile is run upon the runways 9 until the driving wheels are cradled between the cooperating rollers 1 and 10, 1' and 10'. With all connections made as are required by the particular test to be performed, the automobile's engine is driven under conditions simulating road or service conditions. The resistance or load may be varied by varying the rate of discharge of water from the dynamometer through the valve 26, or by controlling the rate of admission of water by the valve 41, or the discharge of air by the control 44. In this way loads may be imposed on the automobile engine corresponding to hill climbing and the like, and the engine may be tested at various speeds under various conditions by the workman upon the platform 93, who is at the same time adjusting and manipulating the engine. The workman may occupy the driver's seat of the automobile and control its engine by the usual controls in the car, or the owner of the car may do so, and while controlling the engine in this way, the conditions under which it is operating may be varied and controlled by means of the valve 4, this being placed conveniently to be operated by the occupant of the driver's seat of the car, and serving to control the water supply to the dynamometer. Such a control might, as is recognized by those familiar with dynamometers, be connected to the discharge line of the dynamometer. During all this time the engine is being cooled in the normal manner by the blower 6 without the expenditure of an undue amount of power, and at an efficient speed of the blower. If desired, the power absorbed by the blower 6 may be suitably calculated or measured and indicated upon the panel 8. The blower or its drive pulley 7 may be disconnected when extreme accuracy is desirable. To this end I provide complemental clutch members 67, engageable and disengageable by a yoke 68 controlled by a suitable handle 69 (Figures 1 and 2).

Features disclosed but not claimed herein are being claimed in my copending application Serial No. 142,888, filed May 15, 1937.

Various changes may be made in the character, arrangement, and control of the device, without departing from the spirit and scope of my invention, and I do not desire to be restricted as to such matters other than as is required by the appended claims.

What I claim as my invention is:

1. In combination, a shaft adapted to be driven from an engine to be tested, an hydraulic absorption dynamometer operatively connected to said shaft, a torque arm movable with the dynamometer housing in accordance with the internal resistance of the dynamometer, indicator means including a member movable in accordance with the pressure of said torque arm, a lever arm resisting pressure of said torque arm, a valve controlling the amount of liquid contained within the dynamometer, and therefore the internal resistance of the latter, and means directly interconnecting the indicator means, torque arm and valve, said parts being so constructed and arranged that the amount of liquid within the dynamometer is increased upon decrease of pressure of the torque arm, and vice versa, and a weight movable along said lever arm at will to vary its resistance to pressure of the torque arm.

2. In combination, a shaft adapted to be driven from an engine to be tested, an hydraulic absorption dynamometer operably connected to said shaft, a torque arm movable with the dynamometer housing in accordance with the internal resistance of the dynamometer, and a torque indicator and dynamometer controlling mechanism including a gauge located distant from the torque arm, a fixed cylinder, a valve housed within the cylinder and operable to control the amount of liquid contained within the dynamometer and therefore the internal resistance of the latter, force transmitting means connecting said valve and torque arm and housed within said cylinder, and means extending from said cylinder interconnecting the force transmitting means with the gauge.

3. In combination, a shaft adapted to be driven from an engine to be tested, an hydraulic absorption dynamometer operably connected to said shaft, a torque arm movable with the dynamometer housing in accordance with the internal resistance of the dynamometer, and a torque indicator and dynamometer controlling mechanism including a gauge located distant from the torque arm, a fixed cylinder, a valve housed within the cylinder and operable to control the amount of liquid contained within the dynamometer and therefore the internal resistance of the latter, force transmitting means connecting said valve and torque arm and housed within said cylinder, said force transmitting means including one arm of a lever member, means extending from said cylinder interconnecting the force transmitting means with the gauge, and means movable along said lever member at will to vary the resistance to pressure of the torque arm.

4. In combination, a shaft adapted to be driven from an engine to be tested, an hydraulic absorption dynamometer operably connected to said shaft, a torque arm movable with the dynamometer housing in accordance with the internal resistance of the dynamometer, and a torque indicator and dynamometer controlling mechanism including a fixed cylinder, a floating valve member reciprocably mounted within said cylinder, and means interconnecting said valve member and torque arm including a reciprocable cylinder slidably mounted within the fixed cylinder, and a plunger secured to the torque arm and reciprocably mounted within said reciprocable cylinder.

5. In combination, a shaft adapted to be driven from an engine to be tested, an hydraulic absorption dynamometer operably connected to said shaft, a torque arm movable with the dynamometer housing in accordance with the internal resistance of the dynamometer, and a torque indicator and dynamometer controlling mechanism including a fixed cylinder, a floating valve member reciprocably mounted within said cylinder, and means interconnecting said valve member and torque arm including a reciprocable cylinder slidably mounted within the fixed cylinder, a plunger secured to the torque arm and reciprocably mounted within said reciprocable cylinder, and means interposed between said valve and reciprocable cylinder operable to vary the resistance to movement of the torque arm, together with a supply conduit for said dynamometer connected to said fixed cylinder adjacent the valve.

6. A machine for testing automobile engines comprising an hydraulic absorption dynamometer provided with a torque arm movable with the dynamometer housing, and further comprising means for controlling the operation of said dynamometer including a torque measuring gauge, a conduit for supplying liquid to said dynamometer, a fluid transmitting conduit connected with said gauge, a fixed cylinder incorporated within said supply conduit, and means housed within said cylinder including a floating cylinder member interconnected with the conduit which is connected with the gauge, means secured to the torque arm and extending within said floating cylinder member, and a floating valve member operable by said floating cylinder and operative to control the amount of liquid contained within the dynamometer.

7. A machine for testing automobile engines comprising an hydraulic absorption dynamometer provided with a torque arm movable with the dynamometer housing, and means for maintaining a fixed amount of fluid within said dynamometer and for measuring the internal resistance of the latter, said means including a fixed cylinder, a floating plunger or valve member housed within said cylinder, and force transmitting means interconnecting said torque arm and valve member including a floating cylinder member also housed within said fixed cylinder member, said fixed cylinder constituting a housing to provide, with the elements housed therein, a unitary compact mechanism for controlling the operation of the dynamometer.

CLAUDE C. BENNETT.